(12) United States Patent
Dong et al.

(10) Patent No.: US 11,475,749 B2
(45) Date of Patent: Oct. 18, 2022

(54) SMOKE DETECTOR CAPABLE OF MULTI-MODE CHARGING AND FIREFIGHTING SYSTEM INCLUDING THE SAME

(71) Applicant: Carrier Corporation, Palm Beach Gardens, FL (US)

(72) Inventors: Hanshu Dong, Shanghai (CN); Jie Xi, Shanghai (CN); JianWei Zhao, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 27 days.

(21) Appl. No.: 17/118,477

(22) Filed: Dec. 10, 2020

(65) Prior Publication Data

US 2022/0051537 A1    Feb. 17, 2022

(30) Foreign Application Priority Data

Aug. 17, 2020  (CN) .......................... 202021710698.3

(51) Int. Cl.
  *G08B 17/10* (2006.01)
  *H02J 50/10* (2016.01)
  *B60L 8/00* (2006.01)
  *H02J 50/00* (2016.01)

(52) U.S. Cl.
  CPC .............. *G08B 17/10* (2013.01); *B60L 8/003* (2013.01); *H02J 50/001* (2020.01); *H02J 50/10* (2016.02)

(58) Field of Classification Search
  None
  See application file for complete search history.

(56) References Cited

U.S. PATENT DOCUMENTS

| 10,476,316 B2 | 11/2019 | Song et al. | |
| 2018/0123379 A1* | 5/2018 | Ha | .......................... H02J 50/20 |
| 2018/0287414 A1* | 10/2018 | Teich | ................... H04B 5/0075 |

FOREIGN PATENT DOCUMENTS

| CN | 204314851 U | 5/2015 |
| CN | 105527050 A | 4/2016 |
| CN | 106325094 A | 1/2017 |
| CN | 205852807 U | 1/2017 |
| CN | 205958026 U | 2/2017 |
| CN | 206378953 U | 8/2017 |
| CN | 206648708 U | 11/2017 |

(Continued)

*Primary Examiner* — John F Mortell
(74) *Attorney, Agent, or Firm* — Cantor Colburn LLP

(57) ABSTRACT

A smoke detector capable of multi-mode charging and a firefighting system including the smoke detector. The smoke detector includes a housing, a working module arranged in the housing and configured for detecting smoke and making a response, and a battery module configured for providing electrical energy to the working module, and further includes: a wireless charging module electrically connected to the battery module, and configured for being in wireless connection with an external wireless charging device to receive electrical energy therefrom and provide the received electrical energy to the battery module; and a light energy charging module electrically connected to the battery module, and configured for collecting light energy in a surrounding environment and converting it into electrical energy which is then provided to the battery module.

9 Claims, 2 Drawing Sheets

(56) References Cited

FOREIGN PATENT DOCUMENTS

| CN | 108180946 A | 6/2018 |
|---|---|---|
| CN | 110533866 A | 12/2019 |
| CN | 111225310 A | 6/2020 |
| CN | 210804433 U | 6/2020 |

* cited by examiner

SMOKE DETECTOR CAPABLE OF MULTI-MODE CHARGING AND FIREFIGHTING SYSTEM INCLUDING THE SAME

CROSS-REFERENCE TO RELATED APPLICATIONS

This application claims priority to Chinese Patent Application No. 202021710698.3, filed Aug. 17, 2020, the contents of which are incorporated by reference herein in their entirety.

FIELD

The utility model relates to the technical field of firefighting, and in particular to a smoke detector capable of multi-mode charging and a firefighting system including the smoke detector.

BACKGROUND

Smoke detectors are also often called as smoke-sensitive detectors, smoke sensors, smoke probes, smoke-sensing fire detectors, etc. The smoke detector is an important firefighting device that can monitor the concentration of smoke on site to achieve fire prevention, security alarming, etc. Many types of smoke detectors have already been provided in the prior art, which are widely installed in commercial and entertainment places, high-rise buildings, industrial plants, stations, terminal buildings, etc., and which play a very good role in ensuring safety. Existing smoke detectors usually use built-in batteries to provide working power, so they need to be charged regularly or replaced with new batteries to ensure that the smoke detectors can work normally and reliably; otherwise, it will affect or even lose the fire monitoring function, thereby bringing undesired security risks.

SUMMARY

In view of the foregoing, the utility model provides a smoke detector capable of multi-mode charging and a firefighting system including the smoke detector, so as to resolve or at least alleviate one or more of the problems described above as well as problems of other aspects existing in the prior art.

Firstly, according to a first aspect of the utility model, a smoke detector capable of multi-mode charging is provided, which comprises a housing, a working module arranged in the housing and configured for detecting smoke and making a response, and a battery module configured for providing electrical energy to the working module, and the smoke detector further comprises:

a wireless charging module electrically connected to the battery module, and configured for being in wireless connection with an external wireless charging device to receive electrical energy therefrom and provide the received electrical energy to the battery module; and a light energy charging module electrically connected to the battery module, and configured for collecting light energy in a surrounding environment and converting it into electrical energy which is then provided to the battery module.

In the smoke detector capable of multi-mode charging according to the utility model, optionally, the wireless charging module comprises at least one electromagnetic induction coil and a wireless charging control circuit electrically connected to the electromagnetic induction coil.

In the smoke detector capable of multi-mode charging according to the utility model, optionally, there are two or more electromagnetic induction coils arranged respectively at different positions inside the housing.

In the smoke detector capable of multi-mode charging according to the utility model, optionally, the wireless charging module and/or the light energy charging module are arranged inside the housing, or are at least partially arranged outside the housing.

In the smoke detector capable of multi-mode charging according to the utility model, optionally, the light energy charging module comprises at least one photoelectric sheet arranged on an outer wall of the housing or near a smoke inlet of the housing.

In the smoke detector capable of multi-mode charging according to the utility model, optionally, the smoke detector further comprises a support member configured for providing support to the external wireless charging device during the wireless charging.

In the smoke detector capable of multi-mode charging according to the utility model, optionally, the support member is configured as a telescopic structure and has at least a first state in which the support member is at least partially accommodated inside the housing, and a second state in which the support member is at least partially placed outside the housing to provide a support position for the external wireless charging device.

In the smoke detector capable of multi-mode charging according to the utility model, optionally, the smoke detector has a charging interface configured for being connected to an external power source through a cable to charge the battery module.

In the smoke detector capable of multi-mode charging according to the utility model, optionally, the external wireless charging device comprises a mobile communication device with a wireless charging function.

Secondly, according to a second aspect of the utility model, a firefighting system is also provided, which includes one or more smoke detectors capable of multi-mode charging as described above.

From the following detailed description combined with the accompanying drawings, the principles, features, characteristics and advantages of the technical solutions according to the utility model will be clearly understood. The overall structure of the utility model is simple, and it is easy to manufacture, install and maintain. The utility model can provide a variety of optional charging modes such as cable charging, wireless charging, and light energy charging for the smoke detector, and it is also quite convenient and flexible in operation, which is advantageous for ensuring the safety and reliability of the smoke detector. Therefore, the utility model has good practicability and promotion value.

BRIEF DESCRIPTION OF THE DRAWINGS

The technical solutions of the utility model will be described in further detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION

Firstly, it should be noted that the structure, components, characteristics, advantages and the like of the smoke detector capable of multi-mode charging and the firefighting system including the smoke detector according to the utility model will be described below by way of example. However, it should be understood that all the descriptions should not be understood as limiting the utility model in any way.

In addition, for any single technical feature described or implied in the embodiments mentioned herein or any single technical feature shown or implied in individual drawings, the utility model still allows for any combination or deletion of these technical features (or equivalents thereof) without any technical obstacle. Therefore, it should be considered that these more embodiments according to the utility model are also within the scope of the description of this document. In addition, general items commonly known to those skilled in the art, such as the structures, configurations and functional components generally applied to existing smoke detectors, will not be described in detail herein.

First of all, according to the solution of the utility model, an improved smoke detector is provided, which allows for the use of various optional ways such as cable charging, wireless charging and light energy charging to supplement electrical energy to a battery therein. A specific example of the smoke detector is given in FIGS. 1 to 3, and the solution of the utility model will be described below in detail in this embodiment.

Referring to the above drawings, in this embodiment, the smoke detector 100 has a housing 1 which may be, for example, configured into a substantially cylindrical, cubic or any other suitable shape. It can be understood that on one hand, the housing 1 can provide an accommodation space for the components included in the smoke detector 100, and on the other hand, the smoke detector 100 can be directly installed to a suitable location on site (such as ceiling, side wall, etc.), for example, by means of an end 7 of the housing. In addition, a smoke inlet with a suitable size and shape can usually be provided at the other end 7' of the smoke detector 100, so that once smoke emerges in the on-site environment, the smoke is allowed to enter the interior of the smoke detector 100 through the above-mentioned smoke inlet (for example, it can go through an optical labyrinth structure arranged inside the housing, etc.), so that smoke conditions can be detected and analyzed accordingly. Then, possible processing such as generating an alarm signal and implementing buzzer alarming may be performed.

Figure 3:
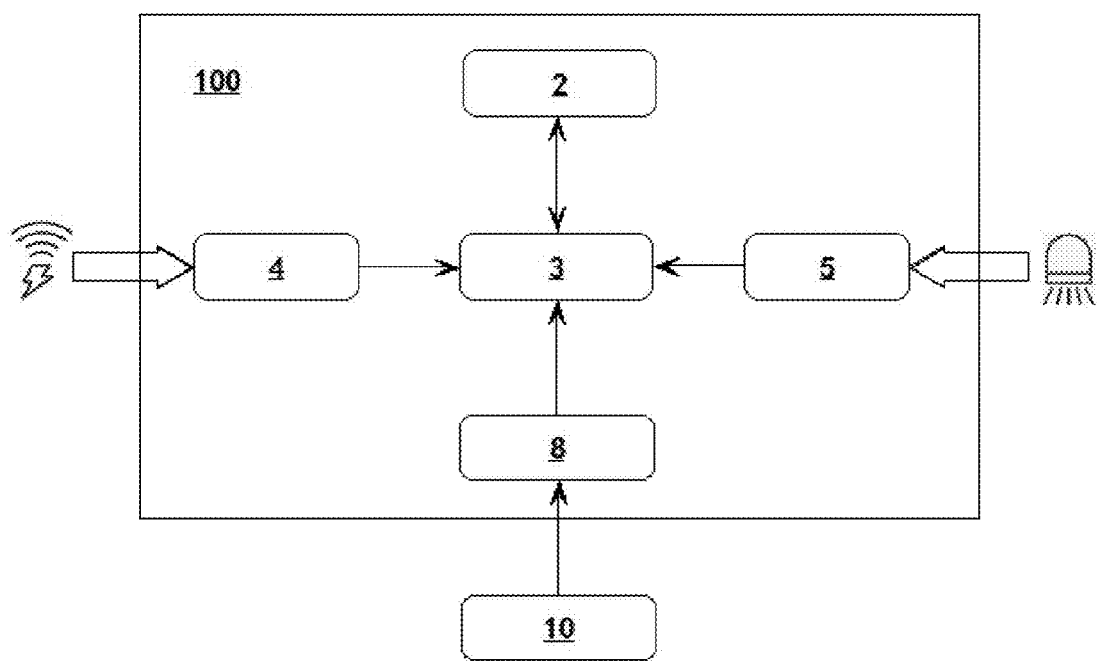
FIG. 3 is a schematic view showing the composition of the embodiment of the smoke detector shown in FIG. 1.

As shown in FIG. 3, as an exemplary illustration, the smoke detector 100 may include a working module 2, a battery module 3, a wireless charging module 4, a light energy charging module 5, and a support member 6. The working module 2 is schematically represented in the form of blocks in FIG. 3, and it should be understood that it can actually be configured as demanded, so it contains any possible component such as a processor chip, a circuit unit, an alarm buzzer, an optical transmitter, an optical receiver, an antenna, etc., so as to detect the smoke conditions and make a response, which will not be explained in this document.

The battery module 3 is configured to provide electrical energy to the working module 2. It may be in the form of a lithium battery, etc. The specific shape, size, battery capacity and the like of the battery module may be set according to actual applications, and the utility model does not impose specific restrictions on them. As an example, in some embodiments, a charging interface 8 (such as a Micro USB interface, a Type-C interface, etc.) may be provided on the smoke detector 100 as shown in FIG. 3, so that the corresponding cable can be used directly to charge the battery module 3 after the charging interface 8 and an external power source 10 is connected by the cable.

The smoke detector 100 is also provided with the wireless charging module 4, which is electrically connected to the battery module 3, so that an external wireless charging device 9 can be used to provide electrical energy to the battery module 3 in a wireless charging manner when needed. For the external wireless charging device 9, it may include, but is not limited to, for example, a mobile communication device (such as a smart phone, etc.) with a wireless charging function, a handheld wireless charging terminal, and the like. When such an external wireless charging device 9 is applied on site, it can be wirelessly connected with the above-mentioned wireless charging module 4 and then transmit electrical energy to it. After receiving the electrical energy, the wireless charging module 4 provides it to the battery module 3 to supplement electrical energy, and the entire wireless charging process can be operated by the staff from a distance on site, so it is very convenient, efficient and safe.

As a feasible solution, the wireless charging module 4 may be configured with an electromagnetic induction coil and a corresponding wireless charging control circuit. After a wireless connection is established with the external wireless charging device 9, the electromagnetic induction coil can be used to generate induced current, and the wireless charging control circuit can be used to control the above current, which is finally provided to the battery module 3.

It should be noted that in some embodiments, two or more electromagnetic induction coils may be further provided in the wireless charging module 4 at the same time, and they are respectively arranged at different positions in the housing 1, thereby allowing for a better wireless connection with the external wireless charging device 9 from multiple different angular orientations, which will be advantageous for ensuring the stability of wireless charging and improving the efficiency of wireless charging.

Of course, it should be noted that for the wireless charging module 4, the utility model completely allows for a flexible application of any feasible wireless charging technical solution (e.g., the Qi wireless charging standard proposed by the Wireless Power Consortium (WPC), etc.) in different embodiments without departing from the spirit of the present application, and a detailed description thereof will not be given herein.

In the smoke detector 100, the light energy charging module 5 is configured to collect light energy in the surrounding environment, and then convert the collected light energy into electrical energy which is then provided to the battery module 3. During actual use, one or more photoelectric sheets may be configured for the light energy charging module 5. For example, one or more photoelectric sheets may be arranged near the smoke inlet of the housing 1 and/or arranged on the outer wall of the housing 1, so as to collect various light energy near the smoke detector.

The wireless charging module 4, the light energy charging module 5, and the charging interface 8 that the smoke detector 100 may carry by itself have been discussed exemplarily above, so as to provide the smoke detector 100 with various charging modes such as wireless charging, light energy charging, direct use of cable charging, which will provide more options for supplementing electrical energy for the battery module 3, so that not only different application requirements can be fully met, but also the reliability and safety of the smoke detector can be advantageously enhanced. The utility model effectively avoids the safety risks that the smoke detector may bring due to insufficient electrical energy, unstable power supply and other reasons. These obvious advantages of the above aspects are not owned by existing smoke detectors.

In addition, for the wireless charging module 4 and the light energy charging module 5, although they are both arranged inside the housing of the smoke detector 100 in the above embodiment, it should be understood that in some applications, part or all of the wireless charging module 4 or the light energy charging module 5 may be arranged outside the housing 1. For example, the above-mentioned electromagnetic induction coil or the photoelectric sheets are allowed to be optionally arranged on the outer wall of the housing 1.

It should also be understood that for the wireless charging module 4 and the light energy charging module 5, the electrical connection between them and the battery module 3 not only includes a direct connection with each other, but also includes an indirect electrical connection implemented through an intermediate member. For example, the wireless charging module 4 or the light energy charging module 5 may be optionally connected to the working module 2, and the provided electrical energy can be optimized by some control components provided on the working module 2 before being conveyed to the battery module 3.

Figure 1:
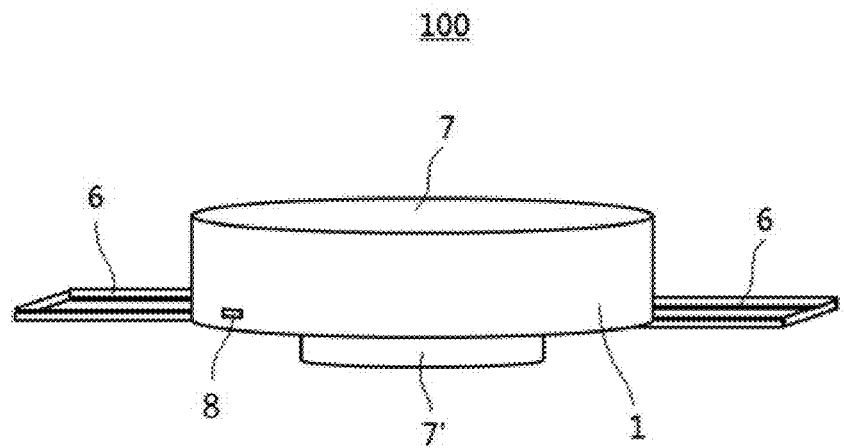
FIG. 1 is a schematic perspective view showing the structure of an embodiment of a smoke detector capable of multi-mode charging according to the utility model, which shows a state in which a support member is being pulled out of a housing.
Figure 2:
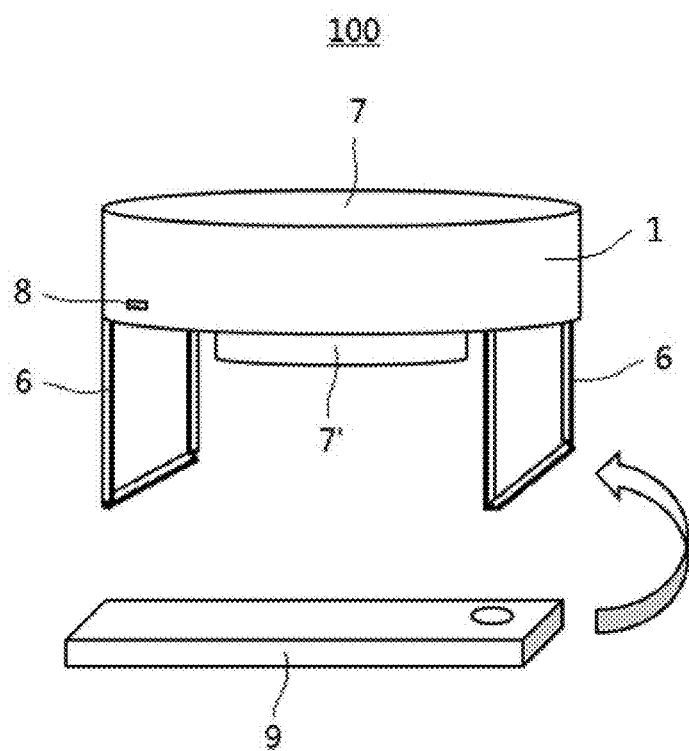
FIG. 2 is another schematic perspective view showing the structure of the embodiment of the smoke detector shown in FIG. 1, which shows a state in which the support member is unfolded and turned downward, and which also shows a mobile communication device for wireless charging.

With continued reference to FIGS. 1 and 2, as an optional situation, a support member 6 may also be provided in the smoke detector 100, so as to support the external wireless charging device 9 during wireless charging.

As a merely exemplary illustration, as shown in FIGS. 1 and 2, the support member 6 can be configured as a telescopic structure. In this way, when the smoke detector 100 does not need to be wirelessly charged in normal times, part or all of the support member 6 can be accommodated inside the housing 1. In addition, once the smoke detector 100 needs to be wirelessly charged, the support member 6 previously accommodated inside the housing 1 can be drawn out and unfolded, so that the external wireless charging device 9 can be provided with a support position outside the housing 1. More specifically, in this example, left and right parts of the support member 6 are both optionally turned downward, so that the external wireless charging device 9 can then be placed on the support position provided by the support member 6 at this point for wireless charging, which is therefore advantageous for achieving stable and efficient wireless charging in a relatively shorter distance. After the wireless charging process is completed, the external wireless charging device 9 can be taken out of the support member 6, and then the support member 6 can be restored to the original state of being accommodated inside the housing 1.

It should be noted that the utility model does not impose any restrictions on the specific structure, state and form of the support member 6, but allows it to be flexibly configured according to different applications, so as to be able to fully adapt to various actual possible requirements. For example, in some embodiments, the support member 6 may be directly configured as a fixed bracket, instead of the telescopic structure discussed above.

As described above, the smoke detector of the utility model has outstanding advantages over the prior art, so it is very suitable for installation and application in many on-site firefighting environments. Therefore, according to another technical solution of the utility model, a firefighting system is also provided, in which one or more smoke detectors capable of multi-mode charging designed and provided according to the utility model may be provided. For example, one or more smoke detectors may be installed on the ceiling, side walls and any other suitable position of the building to monitor smoke conditions of the on-site environment and provide long-term stable and reliable functions such as fire monitoring and prevention, timely security alarming, etc.

The smoke detector capable of multi-mode charging and the firefighting system including the smoke detector according to the utility model have been elaborated above in detail by way of example only. These examples are merely used to illustrate the principles and embodiments of the utility model, rather than limiting the utility model. Various modifications and improvements can be made by those skilled in the art without departing from the spirit and scope of the utility model. Therefore, all equivalent technical solutions should fall within the scope of the utility model and be defined by the claims of the utility model.

What is claimed is:

1. A smoke detector capable of multi-mode charging, comprising a housing, a working module arranged in the housing and configured for detecting smoke and making a response, and a battery module configured for providing electrical energy to the working module, wherein the smoke detector further comprises:
    a wireless charging module electrically connected to the battery module, and configured for being in wireless connection with an external wireless charging device to receive electrical energy therefrom and provide the received electrical energy to the battery module; and
    a light energy charging module electrically connected to the battery module, and configured for collecting light energy in a surrounding environment and converting it into electrical energy which is then provided to the battery module;
    wherein the smoke detector further comprises a support member configured for providing support to the external wireless charging device during the wireless charging;
    wherein the support member is configured as a telescopic structure and has at least a first state in which the support member is at least partially accommodated inside the housing, and a second state in which the support member is at least partially placed outside the housing to provide a support position for the external wireless charging device.

2. The smoke detector capable of multi-mode charging according to claim 1, wherein the wireless charging module comprises at least one electromagnetic induction coil and a wireless charging control circuit electrically connected to the electromagnetic induction coil.

3. The smoke detector capable of multi-mode charging according to claim 2, wherein there are two or more electromagnetic induction coils arranged respectively at different positions inside the housing.

4. The smoke detector capable of multi-mode charging according to claim 1, wherein the wireless charging module and/or the light energy charging module are arranged inside the housing, or are at least partially arranged outside the housing.

5. The smoke detector capable of multi-mode charging according to claim 4, wherein the light energy charging module comprises at least one photoelectric sheet arranged on an outer wall of the housing or near a smoke inlet of the housing.

6. The smoke detector capable of multi-mode charging according to claim 1, wherein the smoke detector further comprises a support member configured for providing support to the external wireless charging device during the wireless charging.

7. The smoke detector capable of multi-mode charging according to claim 1, wherein the smoke detector has a charging interface configured for being connected to an external power source through a cable to charge the battery module.

8. The smoke detector capable of multi-mode charging according to claim 1, wherein the external wireless charging device comprises a mobile communication device with a wireless charging function.

9. A firefighting system, including one or more smoke detectors capable of multi-mode charging according to claim 1.

\* \* \* \* \*